RE 25392
May 29, 1962     G. N. CONTI     3,036,456
METHOD OF CLASSIFYING AND MATCHING BELLOWS UNITS
Filed Jan. 27, 1958
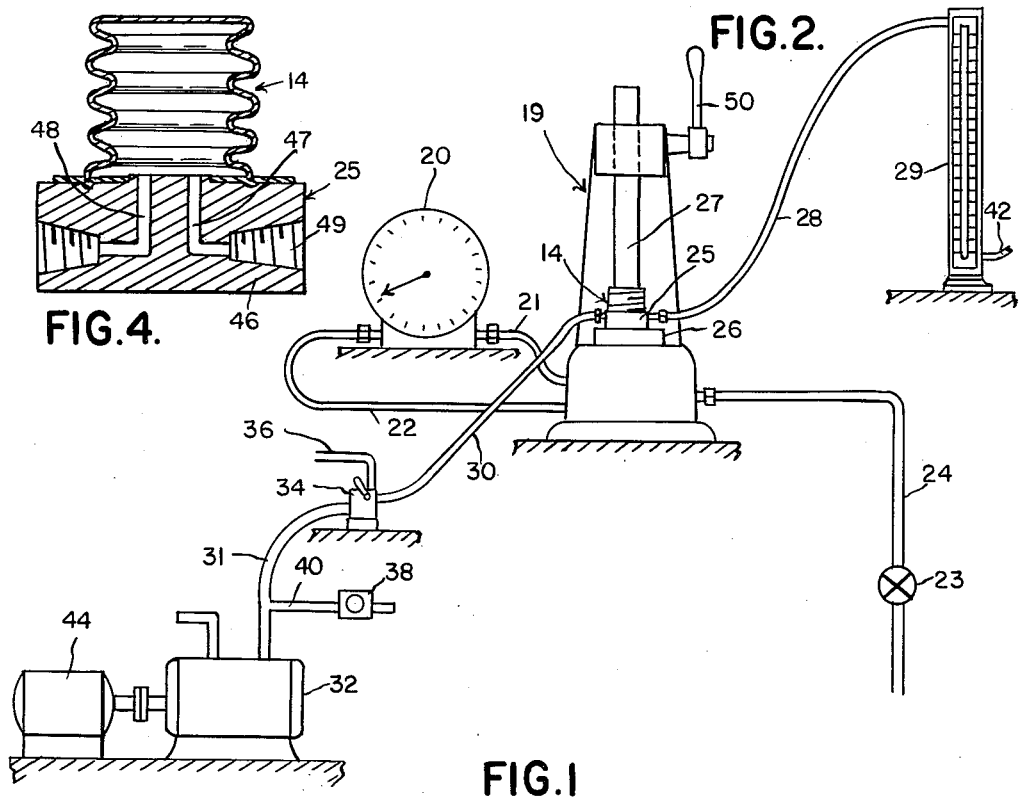
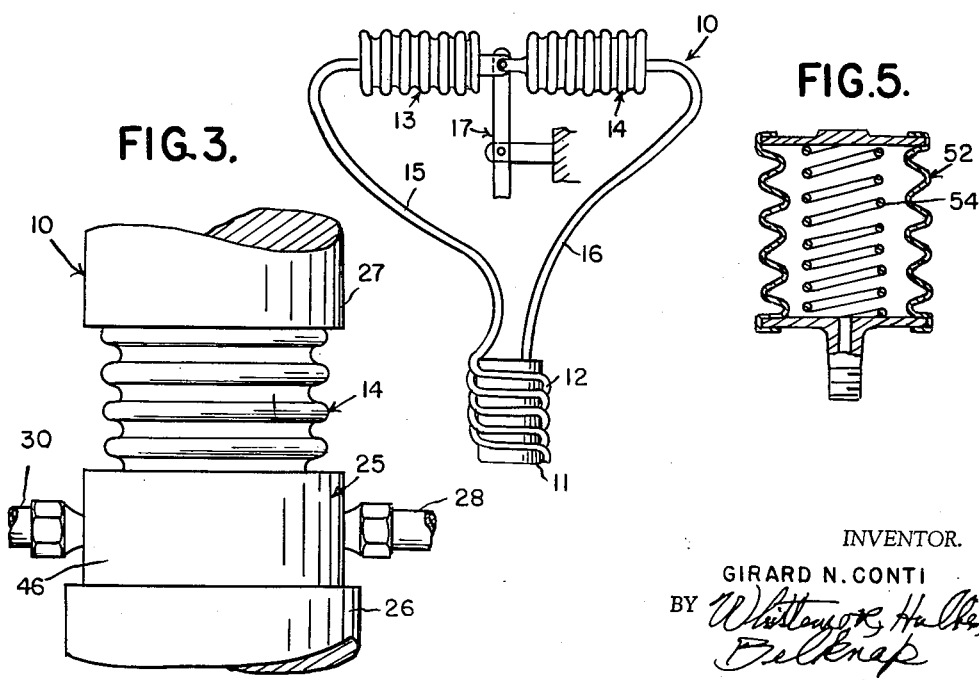
INVENTOR.
GIRARD N. CONTI
BY
ATTORNEYS United States Patent Office 3,036,456
Patented May 29, 1962

3,036,456
METHOD OF CLASSIFYING AND MATCHING BELLOWS UNITS
Girard N. Conti, Mount Clemens, Mich., assignor to Holley Carburetor Company, Van Dyke, Mich., a corporation of Michigan
Filed Jan. 27, 1958, Ser. No. 711,460
2 Claims. (Cl. 73—4)

The present invention relates to the classifying or matching of flexible metallic bellows units, such as are commonly employed in various types of control devices, by a method involving the determination of the total effective area of the bellows.

Many control devices are actuated by the well-known type of metal corrugated bellows, or are in some way effected by bellows means. Such controls, as used, for example, in the aircraft industry, are required to be of the highest degree of accuracy and dependability, and because of this, the bellows unit which is ordinarily the primary sensing member of the control must have at least the same degree of accuracy.

Generally, four types of bellows are used, i.e., liquid filled, evacuated, gas filled and atmospherically vented. Each of these reacts to a different parameter or, to a combination of different parameters. That is, one type may be pressure sensitive, while another may be temperature sensitive, but, regardless of type, it becomes necessary to somehow select the bellows precisely for the control device in question. Without some regard to this selection, results cannot be consistently predicted.

In a typical control the force of a master or motor bellows is opposed by that of a matched bellows which is identically responsive to thermal or pressure change, for the purpose of compensating out the effect of the bellows itself (as well as connecting conduitry) in responding to the change, as distinguished from the response of the fluid in question.

The operation of matching the bellows has in the past consisted primarily of a process of trial and error in that the bellows would be assembled and the control tested. If the control did not function properly, it was concluded that the bellows did not meet requirements. This method resulted in a high percentage of scrap.

It is therefore the general object of this invention to present a method and apparatus for accomplishing this classifying or matching in a simplified manner. The method is one by which the bellows can be accurately categorized prior to the actual matching so that an oversupply of any size will not result.

Another object is to provide a method for the described purpose which is performed in accordance with the principle that the identity of two matched bellows units in respect to temperature or pressure response depends on their equality in total volume, including associated conduits, and that total volume is a function of the total effective area of bellows corrugation or convolution. Once total effective area is determined, different bellows may be quickly classified and coded prior to matching in the control.

A further object is to provide a method in accordance with which a bellows is, under different pressure and/or temperature conditions, measured as to its actual load in pounds, and in which this measurement is employed in a simple equation to determine total effective area.

In accordance with one aspect of the invention, a simple bellows, lacking internal spring means such as are sometimes employed, may be quickly and easily classified on the basis of total effective area alone. In another aspect, in the classifying of spring type bellows, the factors of the spring rate of both the internal compression spring and the bellows itself, in addition to total effective area, are evaluated and employed in solving to determine the overall spring classification.

In general, the method is one which may be quickly, easily and accurately performed by unskilled personnel, employing simple and inexpensive equipment, such as a standard pneumatic spring checker (supplemented in accordance with the invention by an improved special adapter), suitable load and vacuum gauges, a source of vacuum and associated valving.

The foregoing as well as other objects will become more apparent as this description proceeds, especially when considered in connection with the accompanying drawings illustrating preferred embodiments of the invention, wherein:

FIG. 1 is a conventionalized view showing a typical control employing a matched or compensated bellows assembly, for the classifying and facilitated matching of the respective bellows of which the present method was evolved;

FIG. 2 is a schematic layout of equipment used in performing the method;

FIG. 3 is a fragmentary elevation in enlarged scale showing a portion of the spring checker of that equipment, with a simple type bellows under check and special adapter interposed between ram and anvil of the checker;

FIG. 4 is a view in central vertical section through the bellows and adapter of FIG. 3; and FIG. 5 is a view in section similar to FIG. 4 showing an evacuated spring type bellows which may also be classified as to total effective area and spring rates under the principles of the invention.

The disclosure of the method of this invention is presented in two separate parts. The first part will cover the operation and theory as related to those bellows which do not have additional resilient means co-acting therewith, and are either gas or liquid filled, or are evacuated or vented to the atmosphere. The second part will cover the operation and theory as related to those bellows which have such additional resilient means co-acting therewith.

It is believed that a liquid filled bellows for use in a temperature responsive control assembly is best used as an example of the first general type; and FIG. 1 is such a control, designated 10 and well-known in the art. It is generally comprised of a probe 11 surrounded by a liquid-receiving coil 12, a master or motor bellows 13, a compensating belows 14, a conduit 15 connecting bellows 13 with coil 12, and a "blind" conduit 16, identical in section and length to conduit 15, connected to probe 11.

In a system such as this, the probe 11 senses a temperature difference and causes the fluid in the coil 12 to expand or contract accordingly. This expansion is transmitted through conduit 15 to the motor bellows 13 and results in said bellows doing some positive work. However, there is a certain amount of error due to temperature rise and fall in the conduit 15 and bellows 13.

Therefore, the compensating bellows 14 is identically matched with bellows 13, and its conduit 16, in the same shape and length as conduit 15, is attached in heat transfer relation to the probe 11, although the fluid within the conduit 16 and bellows 14 does not communicate with that in the coil 12 of the probe 11. Thus, when these two bellows are placed so as to oppose each other, as through the agency of a mechanical linkage 17, the error which is present in the mottor bellows 13 will be nullified by an equal error established in the compensating belows 14. As a result of this, only the true effect of the temperature difference is indicated by the resulting force of belows 13.

It is apparent then that in order to obtain proper results in a system such as this it becomes necessary to have both bellows units 13, 14 and conduits 15, 16 of equal volume. The volume of the conduits can be readily ascertained because of their shape (constant diameter tubing); however, the bellows present a problem which in the past has been difficult to solve.

As indicated above, the theory on which this invention is based is that the total volume of any bellows convolution is some function of the total effective area of said convolution. Therefore, the basic problem resolves itself not into finding the volume but of finding the total effective area. Once two bellows of equal or near equal total effective area (within tolerance) are found, they can be then used in the same control device.

Referring to FIG. 2, a commercial pneumatic spring checker is indicated at 19, with an attached pressure load gage 20 connected thereto by conduits 21, 22 in a conventional manner. A valve 23 is placed in a conduit 24 which leads from an external source of air presure (not shown) to the pneumatic spring checker, which valve is used to open or shut off the supply of air pressure.

The bellows convolution 13 or 14 and a special adapter 25, of the character, shown in FIGS. 3 and 4, are placed between the lower anvil 26 and upper ram 27 of checker 19. A conduit 28 leads from one side of the adapter 25 and communicates with a standard manometer 29, and a second conduit 30 is connected to the opposite side of the adapter and is communicated at times with a vacuum pump 32. To this end, a two-way selector valve 34 is placed between conduit 30 and a conduit 31 leading to pump 32, and is used to connect either vacuum or atmospheric pressure with conduit 30, and with adapter 25 and the space within bellows 14. A conduit 36 leads from the valve 34 and communicates with the atomsphere. A vacuum bleed valve 38 is also connected to conduit 31 by means of conduit 40, this valve being used to regulate the vacuum to any desired value.

A further conduit 42 leads from one end of manometer 29 and communicates with the atmosphere. The vacuum pump 32 is driven by a suitable motor 44.

As shown in FIGS. 3 and 4, the adapter 25 is in the form of an appropriate base or body 46 having opposed internal passages 47, 48 opening through its top surface, upon which the open lower end of the bellows 14 is disposed. Passages 47, 48 communicate laterally through threaded nipple receiving ports 49 with the opposite outer sides of the body 46.

At the start of the procedure for classifying the nonspring type of bellows 14, valve 34 is positioned so that conduit 30 comunicates with the atmosphere through conduit 36, and the vacuum pump 32 is closed off. The sequence of operations is then as follows:

(1) Valve 23 is fully opened and the external source of super-atmospheric pressure is allowed to communicate with the pneumatic spring checker 19.

(2) Conduits 30 and 28 are attached to the adapter 25 as provided for by the threaded ports 49 of said adapter.

(3) The bellows 14 is placed atop the adapter (FIG. 4), and the combination is then placed atop the lower anvil 26 of spring checker 19.

(4) The upper ram 27 of checker is then manually lowered by its arm 50 and a predetermined load is applied to the bellows 14. This is done in order to establish some reference point, and the load may be as little as 3 lbs. which is read on the gage 20.

(5) The vacuum pump 32 is then started and the valve 34 is turned so that conduit 36 is closed off and pump vacuum communicates with the chamber of convolution 14 as well as the manometer 29.

(6) The vacuum bleed valve 38 is now adjusted until the manometer registers the proper vacuum. This could be, for example, 10 p.s.i. (absolute) or roughly 20.5" Hg.

(7) The bellows 14 is then compressed 0.100 inch by means of the arm 50, i.e., while vacuum is still in communication with the chamber of the bellows, and when the bellows is thus compressed a reading is obtained from gage 20, giving a value of the load under vacuum.

(8) The two-way valve 34 is then turned so that conduit 30 and the chamber of bellows 14 comunicate with the atmosphere. At this time a second reading is obtained on gage 20 which is again the load under this condition.

(9) The total effective area of the bellows is then:

$$T.E.A. = \frac{\text{load difference}}{\text{p.s.i.}}$$

or, the difference in readings between steps 7 and 8 divided by 10, which is the adjusted p.s.i. value of the vacuum as determined by the setting of bleed valve 38.

(10) The checker ram 27 is now raised and the bellows is removed and tagged with the resulting T.E.A. figure.

It can readily be seen that with this method of tagging before the bellows are used in an assembly such as the control 10, it is very easy to select two which have the same total effective area, thus eliminating the possibility of having to scrap any assemblies.

FIG. 5 shows an evacuated bellows 52 with an additional compression spring within, a type selected as illustrative of the second general type of bellows classifiable by the method of the invention.

These bellows must be manufactured to a specification which controls the spring rate of the assembly. Therefore, not only is rate of the spring a factor but also the difference in the spring's length (due to manufacturing tolerances), the spring rate of the bellows, and the total effective area of the bellows.

In the classification of the second, spring equipped type, assuming that the valve 34 is positioned so that conduit 30 communicates with the atmosphere through conduit 36 and the vacuum pump 32 is closed off, the sequence is as follows:

(1) Valve 23 is fully opened and the external source of higher than atmospheric pressure is allowed to communicate with the pneumatic spring checker 19.

(2) Conduits 30 and 28 are attached to the adapter 25 as before.

(3) The bellows 52 with its spring 54 are placed atop an adapter similar to that of FIGS. 3 and 4, and the combination is then placed atop the lower anvil 26 of spring checker 19.

(4) The upper ram 27 of the checker is then manually lowered by arm 50 until the bellows convolutions and spring are compressed to a length equal to the free length of the evacuated bellows when placed in the final control assembly 10, which may be assumed to be 0.765 inch.

(5) The load is then read on gage 20 in pounds, and it may be assumed for illustration that this will be 45 lbs.

(6) The vacuum pump 32 is then started and the valve 34 is turned so that conduit 36 is closed off and the vacuum communicates with the chamber of the convolution 52 and the manometer 29.

(7) The vacuum bleed valve 38 is then adjusted until the manometer registers the proper vacuum. This could be, for example, 25" Hg.

(8) The load in pounds is then read on gage 20 again. Let it be assumed that the reading is 27 lbs. 14 oz., as compared with the other assumed load of 45 lbs.

(9) Solve for total effective area:

$$T.E.A. = \frac{\text{load difference}}{(.491) \times (25 \text{ in. Hg})}$$

$$= \frac{17.125 \text{ lbs.}}{12.275 \text{ lbs./in.}^2} = 1.395 \text{ sq. inches}$$

(10) Since the part of a standard bellows specification which deals with spring rates is usually stated, for example, as follows: "the travel of the free aneroid between 5" Hg and 55" Hg absolute pressure is to be .270±6% inches" it follows that in order to proceed further it becomes necessary to determine the combined spring rate of the bellows convolutions and spring. This can be accomplished by the following formula:

$$\frac{(55'' \text{ Hg} - 5'' \text{ Hg}) \times \left(\frac{.491 \#/\text{sq. in.}}{\text{in. Hg}}\right) \times (1.395 \text{ sq. in.})}{.270 \text{ inch}}$$

$$= 126.5 \text{ lbs./in. combined spring rate}$$

(11) At this point, the effective area of the convolutions is known (1.395 sq. in.) and the combined spring rate is known (126.5 lbs./in.). The next step is to determine the spring rate of the bellows convolution itself. This can be accomplished by:

(A) Placing the bellows 52 alone between suitable end adapters and placing the combination atop anvil 26 of checker 19.

(B) Lowering upper ram 27 onto the combination until the gage 20 registers a reference load, for example, 3.0 lbs.

(C) Next compressing the bellows some predetermined amount, for example, 0.100 inch, at which time a second reading is taken on gage 20, which may be assumed to be 6.0 lbs.

(D) The rate of bellows would then be $$\frac{6.0 \text{ lbs.} - 3.0 \text{ lbs.}}{.100 \text{ inch}} = 30 \text{ lbs./inch}$$

(12) Knowing what the combined spring rate must be (126.5 lbs./inch), and what the rate of the bellows is (30.0 lbs./inch), it becomes simply a matter of subtraction to find that the rate of the spring 54 is 96.5 lbs./inch.

(13) At this point, the following is known:

Spring rate of spring—96.5 lbs./inch
Spring rate of bellows—30.0 lbs./inch
Combined spring rate—126.5 lbs./inch
Total effective area—1.395 sq. inches Next, because of manufacturing tolerances in the springs, it becomes necessary to establish the correct length of spring for the particular bellows convolution in question, and it will be assumed that the specifications call for length of bellows and spring to be compressed to a 0.896" overall dimension at standard barometric pressure. In order to find the correct length, the total force required to compress the assembly must first be calculated. Therefore:

1.395 sq. inches T.E. Area × 14.7 p.s.i.a.
20.502 lbs. required to compress spring and bellows to .896" dimension

(14) This answer is then checked on the pneumatic spring checker 19, by placing the combined spring 54 and bellows 52 on the lower anvil and compressing the combination to a dimension of 0.896 inch. When this dimension is obtained, the applied load is read on gage 20. It should be noted that this load should not include the weight of the bellows and spring, which can be avoided by placing the combination on the anvil and turning the gage to a new zero reading.

If the load on the gage is the same as the calculated weight, then bellows convolutions and spring are the correct combination. If the gage load is greater, it means that a shorter spring of the same rate must be used. If the gage load is less, then a longer spring with the same rate must be used.

It is obvious that in a manufacturing operation wherein the types and relative sizes of bellows are similar, a chart may be constructed which would facilitate matching operations. That is, the various factors of rate and effective area may be determined and the parts tagged so that the last operation would be a mere selective matching operation.

The drawings and the foregoing specification constitute a description of the improved method of classifying and matching bellows units in such full, clear, concise and exact terms as to enable any person skilled in the art to practice the invention, the scope of which is indicated by the appended claims.

What I claim as my invention is:

1. A method of classifying a bellows or like axially extending, flexibly movable unit on the basis of the total effective area thereof, comprising the steps of placing the interior of said unit under a predetermined subatmospheric pressure with the unit predeterminedly loaded axially, measuring said internal pressure of the thus loaded unit, changing mechanically the axial load on the unit while under said internal subatmospheric pressure, measuring said changed load, altering the internal pressure of said unit, and measuring the axial load thereof under said altered internal pressure.

2. A method of classifying a bellows or like axially extending, flexibly movable unit on the basis of the total effective area thereof, comprising the steps of placing the interior of said unit under a predetermined subatmospheric pressure with the unit predeterminedly loaded axially, measuring said internal pressure of the thus loaded unit, changing mechanically the axial load on the unit while under said internal subatmospheric pressure, measuring said changed load, altering the internal pressure of said unit, measuring the axial load thereof under said altered internal pressure, and determining the total effective area rating of said unit by dividing the difference in measured axial loadings by the measured internal pressure.

References Cited in the file of this patent

UNITED STATES PATENTS

| | | |
|---|---|---|
| 2,534,123 | Hasselhorn | Dec. 12, 1950 |
| 2,854,846 | Kaderly | Oct. 7, 1958 |

FOREIGN PATENTS

| | | |
|---|---|---|
| 873,880 | France | Apr. 13, 1942 |

OTHER REFERENCES

Publication: Navy Dept., Bureau of Aeronautics Report #ASL NAM 2425, Part XIV, "Teleflight Pressure Transmitters," issued Oct. 4, 1949, pages 4, 5 and Plate No. 2.